United States Patent
Wang et al.

(10) Patent No.: US 7,130,819 B2
(45) Date of Patent: Oct. 31, 2006

(54) METHOD AND COMPUTER READABLE MEDIUM FOR SEARCH SCORING

(75) Inventors: Xuejun Wang, San Jose, CA (US);
Brian Acton, Saratoga, CA (US);
Venkat Panchapakesan, Newark, CA (US)

(73) Assignee: Yahoo! Inc., Sunnyvale, CA (US)

( * ) Notice: Subject to any disclaimer, the term of this patent is extended or adjusted under 35 U.S.C. 154(b) by 97 days.

(21) Appl. No.: 10/675,234

(22) Filed: Sep. 30, 2003

(65) Prior Publication Data
US 2005/0071255 A1 Mar. 31, 2005

(51) Int. Cl.
*G06Q 30/00* (2006.01)
(52) U.S. Cl. ........................................ 705/26
(58) Field of Classification Search ................. 705/26, 705/27; 707/3, 5, 7
See application file for complete search history.

(56) References Cited

U.S. PATENT DOCUMENTS

| | | | |
|---|---|---|---|
| 6,269,361 B1* | 7/2001 | Davis et al. | 707/3 |
| 6,321,221 B1* | 11/2001 | Bieganski | 707/5 |
| 6,466,970 B1* | 10/2002 | Lee et al. | 709/217 |
| 6,480,837 B1* | 11/2002 | Dutta | 707/3 |
| 6,499,052 B1 | 12/2002 | Hoang et al. | 709/203 |
| 6,631,372 B1* | 10/2003 | Graham | 707/5 |
| 6,785,671 B1* | 8/2004 | Bailey et al. | 707/3 |
| 2003/0135490 A1* | 7/2003 | Barrett et al. | 707/3 |

FOREIGN PATENT DOCUMENTS

WO WO 9941694 A1 * 8/1999

OTHER PUBLICATIONS

Sicaras, Victoria K.: "Searching for the perfect way to search"; Research & Development; Jun. 2000; v42, i6, pE17.*

* cited by examiner

Primary Examiner—Jeffrey A. Smith
(74) Attorney, Agent, or Firm—Morrison & Foerster LLP

(57) ABSTRACT

A method and apparatus for generating search results with higher relevancy. The present invention exploits the fact that users' choices on each given search term tend to converge to several products from several merchants, and all of the results are very relevant to the search term. In one embodiment, these results are used to decide the order of merchants for each search term. By learning the users' choices, especially from purchasing and/or clicking information, highly relevant and most popular products can be assigned a higher score or rank over text relevant only products.

33 Claims, 8 Drawing Sheets

METHOD AND COMPUTER READABLE MEDIUM FOR SEARCH SCORING

The present invention relates to a method and apparatus for scoring or ranking results of a search. More specifically, the present invention relates to a scoring approach based on transaction and/or click records.

BACKGROUND OF THE INVENTION

With the proliferation of vast amount of information on the Internet, it is often very difficult to search and locate relevant information without having to first expend a great deal time to peruse over many irrelevant search results. Depending on the material that is being sought, the user is often frustrated by having to view many immaterial search results.

Scoring or ranking is one of the core problems in search, for example, especially in shopping/product search. If a search cannot provide the most relevant documents near the top of a listing of search results, it is often called irrelevant. Users tend to have higher relevancy requirements on searches such as shopping/product search than regular web searches because their goals are not just in finding one relevant result. They often want to see the most relevant products and be able to compare among different products and different merchants.

Pure text relevance based scoring is the foundation of several search technologies. The basic idea is to find text that matches in the document's title, description, and other fields. Additional refinements can be added, e.g., providing some fields, like title, with a higher weight, providing phrase matches with a higher weight and so on. However, all these pure text relevancy scoring approaches have a problem in generating the most relevant search results because they cannot determine what exactly the users are searching for.

For example, in a pure text relevancy search, when searching for the term "computer", documents with title like "Sony VAIO FX340" would not be viewed as a good text match because the title does not contain the term "computer", whereas documents with titles like "computer case" will be viewed as a good match. This example demonstrates that a search for a computer will likely produce search results with many irrelevant items.

Even when all the results are perceived to be relevant, it would still be preferable to provide products that are more popular with a higher score or rank. However, a pure text relevancy search would not be able to provide this important distinction.

Therefore, there is a need in the art for a method and apparatus that provides search results with higher relevancy.

SUMMARY OF THE INVENTION

In one embodiment, the present invention provides a method and apparatus for generating search results with higher relevancy. For example, the present invention provides a method and apparatus for generating search results with higher relevancy for shopping/product searches.

One premise of the present invention is that users are broadcasting their preferences as to favorite products for popular search terms, through purchasing and/or clicking on products they like. When users search a term in a shopping/product search site, although the site may return many irrelevant results, many users will filter out irrelevant results by simply selecting the results that they are interested in, i.e., relevant results. This is especially accurate when a user actually buys a product from a list of search results, thereby not only indicating the relevancy of the result for the search term, but also the relevancy of the price of the purchased product and/or the relevancy of the merchant who is selling the purchased product.

The present invention exploits the fact that users' choices on each given search term tend to converge to several products from several merchants, and all of the results are very relevant to the search term. In one embodiment, these results are used to decide the order of merchants for each search term. By learning the users' choices, especially from purchasing and/or clicking information, highly relevant and most popular products can be assigned a higher score or rank over text relevant only products.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

Figure 1:
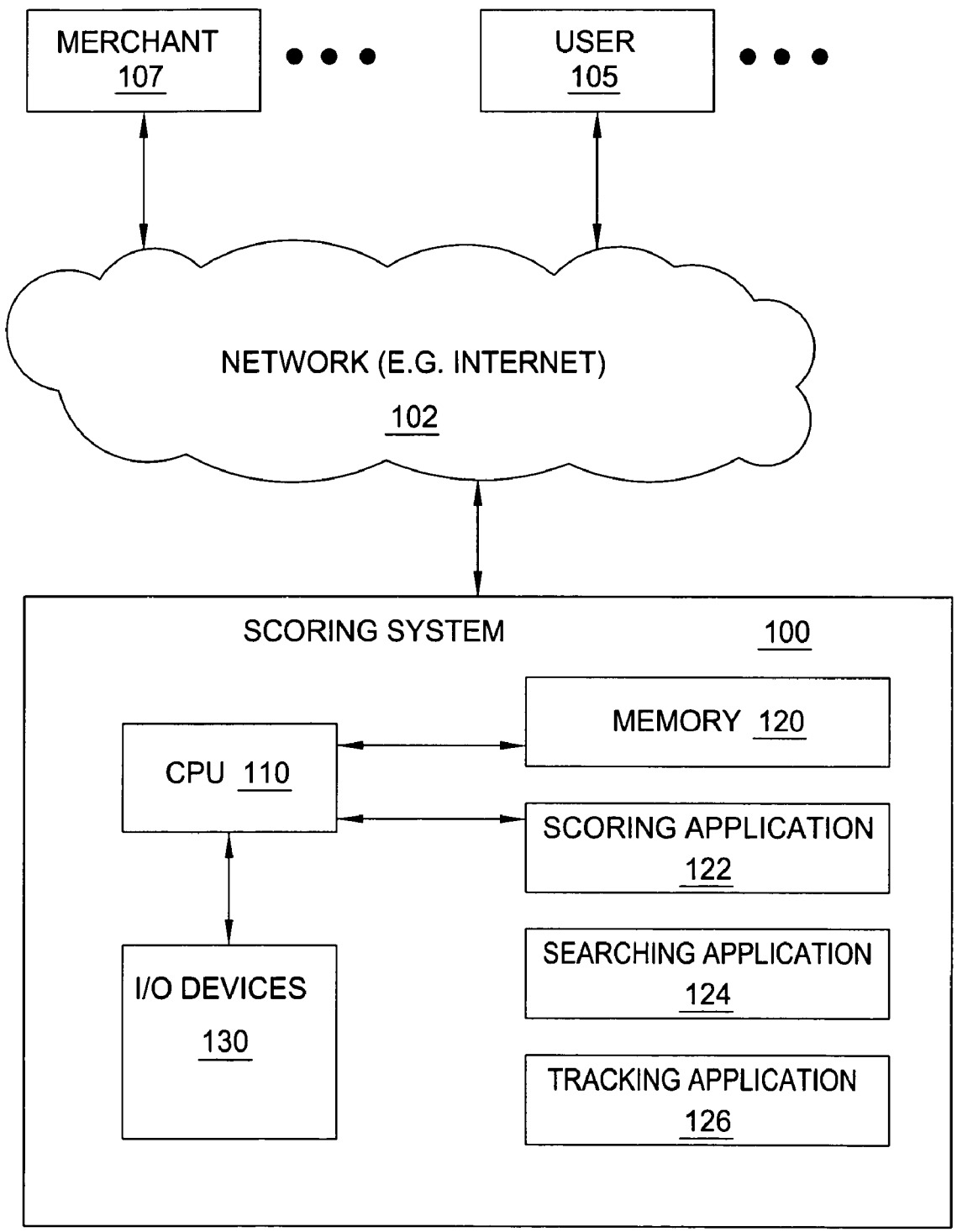
FIG. 1 is a block diagram illustrating a scoring system of the present invention.

FIG. 1 is a block diagram illustrating a scoring system 100 of the present invention. The scoring system 100 is tasked with scoring a document, e.g., a product, within a search result set generated in accordance with a search term.

More specifically, FIG. 1 illustrates a scoring system 100 that is interacting with a network, e.g., the Internet 102, where a plurality of users 105 is allowed to conduct searches. The search is typically triggered by the users who will input one or more search terms, e.g., "laptop computer", "DVD", "gas grill" and so on. The search may include a search for products and services desired by the users. The products and services may be offered by an entity maintaining the scoring system 100, e.g., a company that is operating a website that offers a large volume of products and services, e.g., Walmart and the like. Alternatively, the products and services may be offered by a plurality of merchants 107, where the scoring system 100 is deployed by a third party and is only tasked with generating the search results associated with the search term provided by the users, e.g., a search engine application. In sum, the scoring system 100 of the present invention is not limited in the manner that it is deployed.

In one embodiment, the scoring system 100 is implemented using a general purpose computer or any other hardware equivalents. More specifically, the scoring system 100 comprises a processor (CPU) 110, a memory 120, e.g., random access memory (RAM) and/or read only memory (ROM), a scoring engine or application 122, a searching engine or application 124, a tracking engine or application 126 and various input/output devices 130 (e.g., storage devices, including but not limited to, a tape drive, a floppy drive, a hard disk drive or a compact disk drive, a receiver, a transmitter, a speaker, a display, an output port, a user input device (such as a keyboard, a keypad, a mouse, and the like), or a microphone for capturing speech commands).

It should be understood that the scoring engine or application 122, the searching engine or application 124, and the tracking engine or application 126 can be implemented as physical devices or systems that are coupled to the CPU 110 through a communication channel. Alternatively, the scoring engine or application 122, the searching engine or application 124, and the tracking engine or application 126 can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory 120 of the computer. As such, the scoring engine or application 122, the searching engine or application 124, and the tracking engine or application 126 (including associated data structures) of the present invention can be stored on a computer readable medium, e.g., RAM memory, magnetic or optical drive or diskette and the like.

In sum, the scoring system is designed to address the criticality of improving search relevancy. The present invention exploits the fact that users disclose their preference pertaining to favorite products for popular search terms through purchasing or clicking on products that they like. When users search a term in a shopping/product search site, the site will often return numerous irrelevant results, even in the top result positions. Often, users will simply filter out the wrong results, and only select the results that they are interested in, i.e., relevant results. The relevancy of the search results is significantly substantiated when a user actually purchases a product selected from the search results. Namely, when a user decides to buy the product, then the product he or she chose must be highly relevant to the search term within the context of the price of the product and/or the merchant selling the product.

It has been determined that if the tracking data size is sufficiently large, users' choices on each given search term tend to converge to several products from several merchants, and all of the results are very relevant to the search term. By learning and applying users' choices, especially from purchasing and/or clicking, highly relevant products can be assigned with higher score/rank than over text relevant only products. This novel approach will produce highly relevant search results for a search term. In fact, additionally refinements or normalization can be applied, e.g., the ordering of merchants for each search term. These optional adjustments are further described below.

In one embodiment of the present invention, the score assigned to a product in response to a search term that is based on user purchase and/or click information is referred to as a "hotscore". This hotscore can be used by a search engine in producing search results in response to a search term. It should be noted that the present hotscore can be used as the dominate (a more heavily weighed) parameter in generating the search results or, alternatively, is employed to supplement a search engine that currently employs other parameters, such as including, paid inclusion, paid sponsorship, text relevancy, as the dominate parameter.

Figure 2:
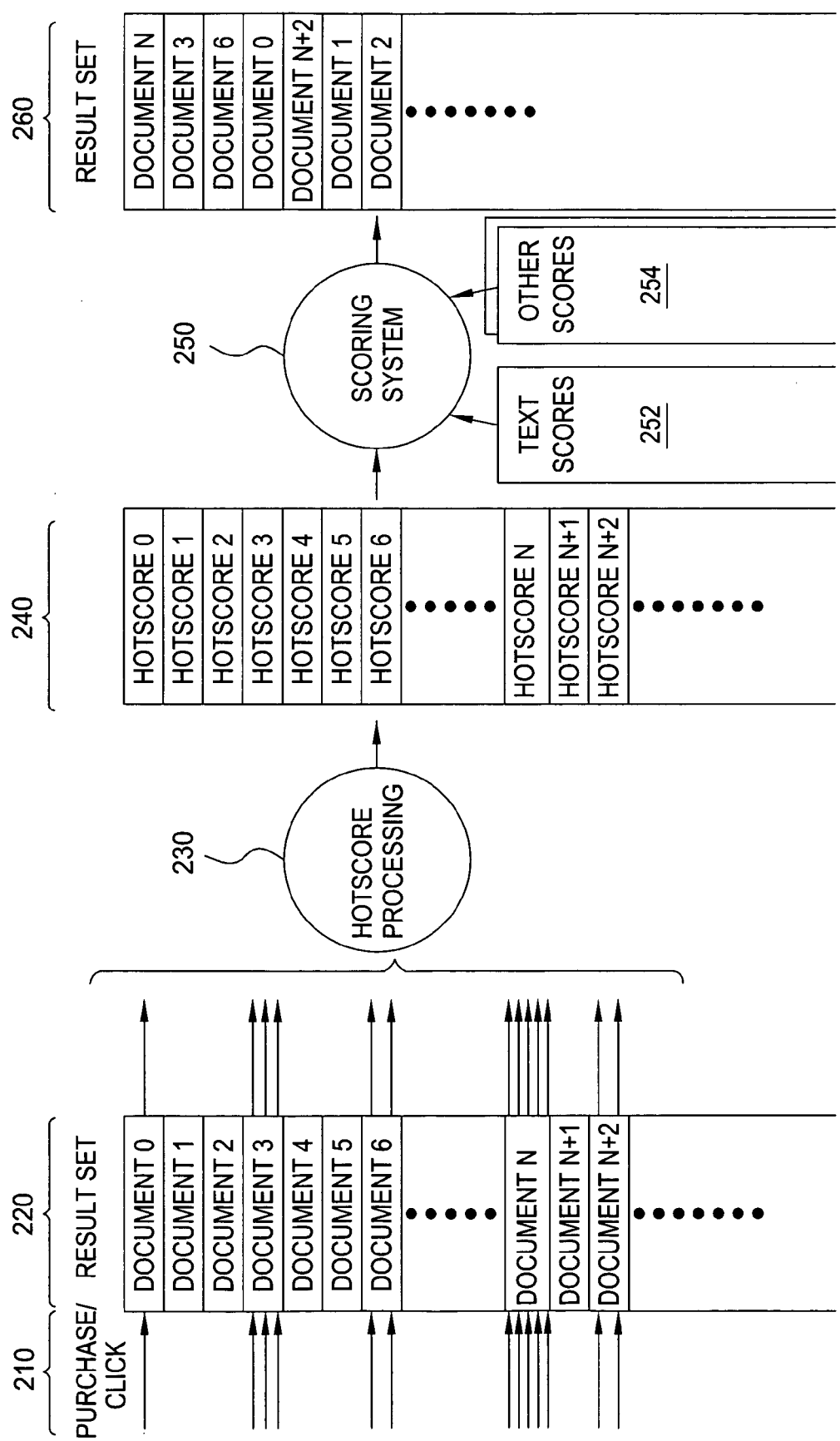
FIG. 2 illustrates the relationship of applying the present scoring method to effect the listing order of documents in a search result.

FIG. 2 illustrates the relationship of applying the present scoring method to effect the listing of documents in a search result set with greater relevancy. FIG. 2 illustrates a first result set 220 that is generated and presented to users in response to a particular search term. In this example, the items in the search result set are broadly defined as documents, where within the scenario of shopping, the documents would be products or product-merchant pairs. However, documents are intended to broadly include websites, textual documents, images, and so on.

FIG. 2 illustrates the tracking of users' response to the first result set 220 by tracking the purchase and/or the click 210 of various documents within the first search result set. This purchase and/or the click information is tracked and is then used by a scoring process 230 to generate a plurality of scores (hotscores) 240 with each score associated with one of the documents. In turn, the hotscores 240 are optionally used by another scoring system 250 that may apply the hotscores in conjunction with text scores 252 and other scores 254 (e.g., paid-inclusion scores) to generate a second search result set 260 in response to the same search term that generated the first result set. FIG. 2 illustrates that the application of the hotscores has now affected the ordering of the documents and possibly the addition or deletion of documents in the second result set, thereby providing better relevancy in the second search result set.

In one embodiment, for each search term, the present invention tracks merchant/product-id pairs that each user clicks and finally buys. More detailed information is also tracked, including the product position in the search results when the click/purchase occurs, the time when this behavior occurs, and the department the product is assigned when this behavior occurs.

Figure 3:
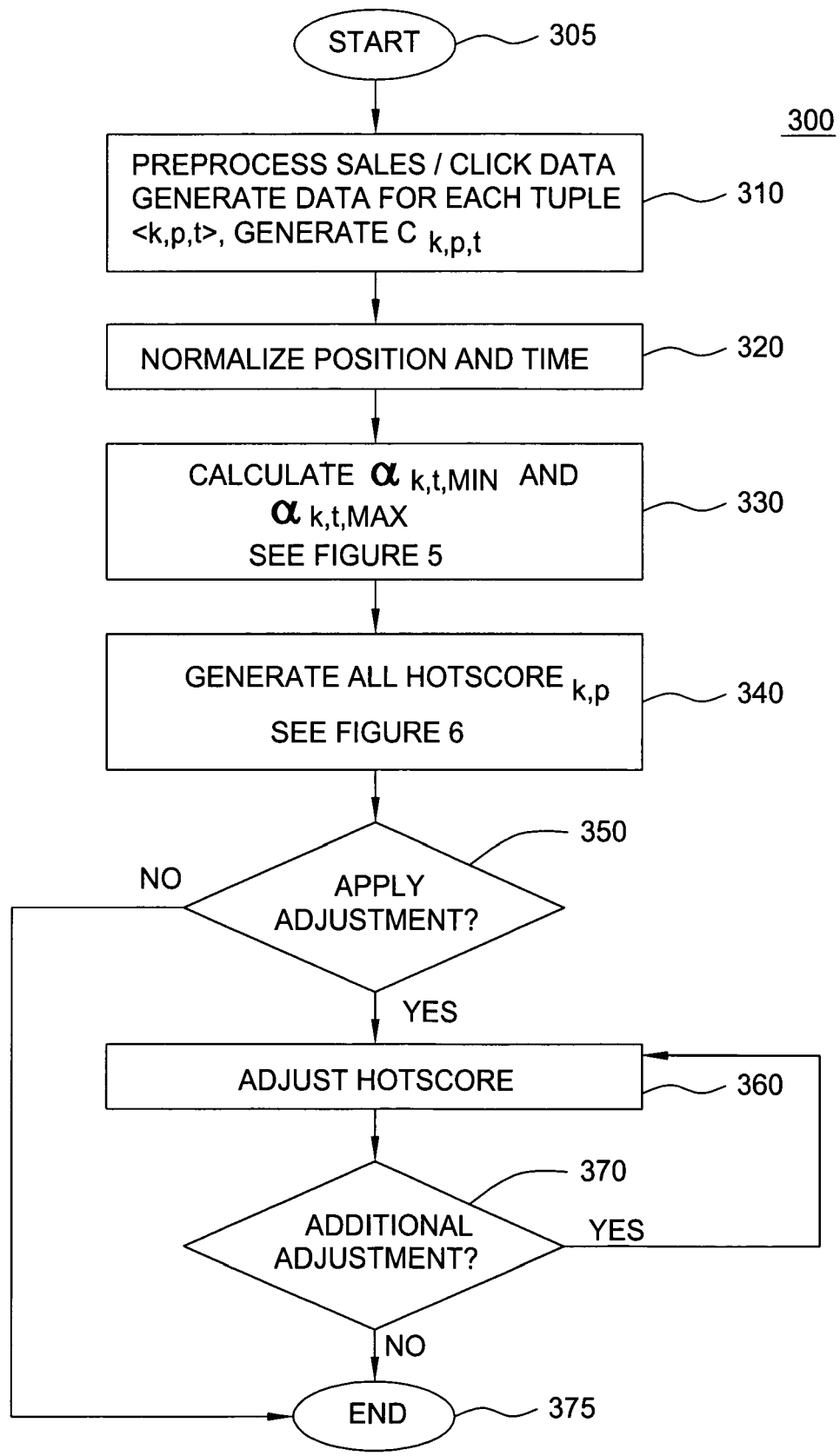
FIG. 3 illustrates a flowchart of a method for generating hotscores for a plurality of products.

FIG. 3 illustrates a flowchart of an exemplary method 300 for generating hotscores for a plurality of products. Method 300 starts in step 305 and proceeds to step 310.

In step 310, method 300 preprocess sales and/or click data for each product in accordance with a particular search term. For example, the present invention generates data for each tuple <k, p, t>, where k is a search term, p is a product, t is a type. Namely, method 300 will generate $C_{k,p,t}$, which is a count or a number of the type t events that have occurred over the time period of "tp" for the search term k. Type t events may define a particular type of purchase event and/or a click event (e.g., a purchase of the product from a preferred vendor or clicking on a document on a search result). A plurality of exemplary type events is disclosed below.

Specifically, for a given time range, which can be defined and tuned in a configuration file, all the merchant/product-id pairs for each search term are categorized to different types and counted based on $C_{k,p,t}$. Additionally, low confidence results are eliminated. Low confidence results may include spamming results and scattered results. Scattered results are those results that are repeated under a given threshold, e.g., links that were accessed incidentally and do not substantially indicate relevance of the links.

In step 320, method 300 optionally normalizes the data to account for time and/ or position. Specifically, it has been observed that the "higher" position a product is in a search result set, the higher probability that it is clicked/purchased by users. More specifically, it is also an observation that clicks are highly affected by position (e.g., higher positioned products are often "clicked") while purchase is slightly affected (e.g., a purchaser is only influenced slightly as to the position of a relevant product). Thus, a user may click on the higher positioned products but may end up purchasing a product listed in a much lower position due to relevancy.

The first top position in a search result set is deemed to be located at a highest position within the search result set. In order to find more pertinent results, confidence on a merchant/product-id pair is normalized based on the position(s) when the click/purchase occurs. For example, a purchase or a click at a very low position document within the result set will indicate a high relevancy of that document relating to the search term.

Optionally, the data can be normalized to account for time ("happen time" or "occurrence time"). Namely, how recent was the sale and/or click on the document. Although the "occurrence time" of a merchant/product-id pair should not affect the relevancy on the pair, it does possibly or potentially reflect a new trend in the market. Catching this trend and always showing the most popular results first is one of the goals of the present scoring invention. In other words, relevant products can be listed in an order that accounts for popularity or "time relevance" of the products. Various kinds of normalization functions for position and time normalization can be deployed.

In step 330, method 300 calculates a configuration parameter $\alpha$. More specifically, method 300 calculates $\alpha_{k,p,MAX}$ and $\alpha_{k,p,MIN}$ for each <k, t> pair. The configuration parameter is used to define the impact of different types of purchase and/or clicks. For example, a purchase that is made through a store (e.g., deemed to be a non-preferred small merchant) is different than a purchase made through a catalog (e.g., deemed to be a preferred large merchant). Similarly, a purchase made through a "preferred merchant" is different than a purchase made with a "general merchant". These distinctions are important to the operator of the present scoring system since such information pertaining to purchase and click types can be used to further refine the relevancy of the search results as disclosed below.

In step 340, method 300 generates a score (hotscore) for each product for each search term based upon purchase and/or click information. This score can be generated in a number of different approaches that are further disclosed below. Namely, different formulas can be applied to correspond to a company's strategy. Thus, a hotscore for a merchant/product-id pair computed in one formula may be different when computed in a second formula.

In step 350, method 300 queries whether an adjustment to the hotscore is necessary. Specifically, adjustments can be optionally applied to account for different knowledge, e.g., specific knowledge of the search term, knowledge about performance of a merchant-product pair, knowledge of purchaser behavior, knowledge of the age of purchasers, knowledge of the gender of purchasers and the like. If such knowledge is available, then the hotscore can be adjusted accordingly.

For example, adjustment to the hotscore can be made based on popular search terms. For some popular search terms contained in a knowledge base, the present invention may add sales information to the search term. For example, in one embodiment, the search term "dell" can be translated as "manufacturer=Dell", where the present invention may apply all sales information on "manufacturer=Dell" to the search term "dell".

Alternatively, adjustment to the hotscore can be made based on users behavior on related search terms. Users' behavior on related searches can assist in creating real links between a generic search term and its related narrower search terms. Namely, this will help users narrow their searches onto generic search terms. In one embodiment, the present invention adds related search term's hotscore for merchant/product pairs to the generic search terms, thereby expanding the coverage.

Alternatively, adjustment of the hotscore can be made if data indicates that a matching of a merchant-product pair is under performing, i.e., adjusting a hotscore to reduce the effect of the scores for incorrect or disfavored documents. For example, the present system continues to evaluate the results after hotscores are assigned to merchant-product pairs. Pairs that are not performing well are presumed to be wrongly selected documents or disfavored documents for the search result set, and will have their hotscores reduced. For example, the search results may provide a plurality of relevant documents (e.g., merchant-product pairs that are highly relevant to a search term), but for one reason or another, purchasers are not interested in a particular subset of the merchant-product pairs. In such scenarios, such relevant, but disfavored merchant-product pairs are "punished" so that they will have lower or even negative hotscores.

Returning to step 350, if the query is negatively answered, then method 300 ends in step 375. If the query is positively answered, then method 300 proceeds to step 360 where the hotscore is adjusted.

In step 370, method 300 queries whether an additional adjustment to the hotscore is necessary. If the query is positively answered, then method 300 proceeds to step 360 where the hotscore is again adjusted. If the query is negatively answered, then method 300 ends in step 375.

Once the hotscores are generated, a search engine 124 can immediately apply the hotscores to effect shopping/product searching. In one embodiment, a search scoring based on any searching methods is adjusted with the present hotscores on the fly. For example, when a user types in a search term, a shopping/product search system will issue a search to the search engine, with a ratio of hotscore boost. This ratio could be very high, which means all products with hotscores will be in front of those without hotscores. It could also be very low, which means hotscore will only affect the order of search results minimally.

Figure 4:
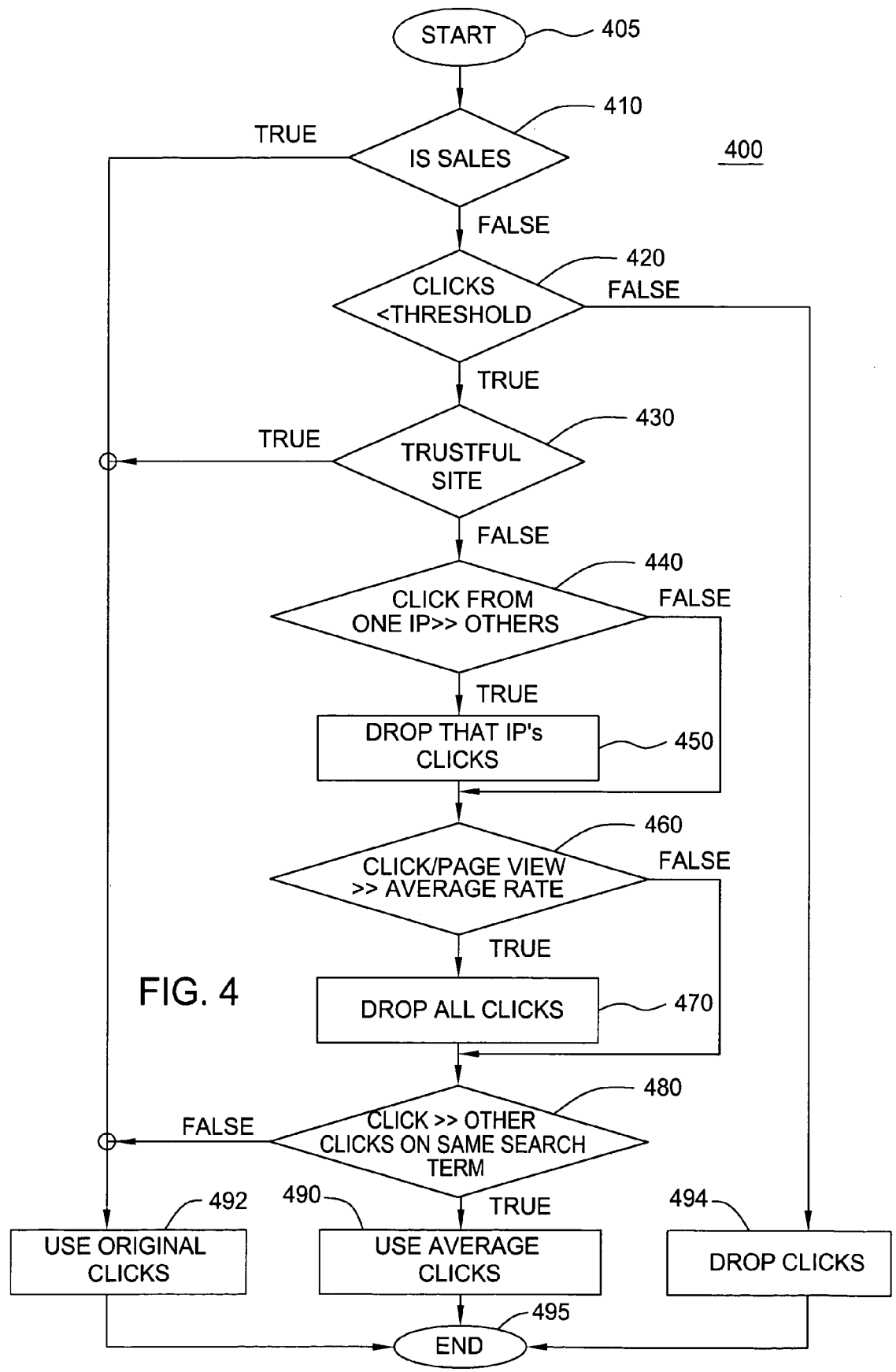
FIG. 4 illustrates a flowchart of a method for preprocessing sales and click data.

FIG. 4 illustrates a flowchart of a method 400 for preprocessing sales and click data. Method 400 starts in step 405 and proceeds to step 410.

In step 410, method 400 queries whether the click information pertains to an actual sale of the product. If the query is positively answered, then method 400 proceeds to step 492 where the original click information is used. Namely, sales of a product provide the highest confidence in terms of relevancy of the search results. Thus, click information associated with sales is retained and used. If the query is negatively answered, then method 400 proceeds to step 420.

In step 420, method 400 queries whether the click information is less than a predefined threshold. If the query is positively answered, then method 400 proceeds to step 430. If the query is negatively answered, then method 400 proceeds to step 494, where the click information is discarded. Namely, step 420 is intended to remove erroneous click data, e.g., a flooding attack that artificially inflats access to a particular document within the search result.

In step 430, method 400 queries whether the click information is from a trusted site. If the query is positively answered, then method 400 proceeds to step 492 where the original click information is used. Namely, click information on a product from a trusted site provides some confidence in terms of relevancy of the search results. Thus, click information is retained and used. If the query is negatively answered, then method 400 proceeds to step 440.

In step 440, method 400 queries whether the click information from a particular IP address is greater than other IP addresses. In other words, whether statistically the click information associated with a particular IP address is unusual high when compared to click information from other IP addresses. If the query is positively answered, then method 400 proceeds to step 450 where the click information from that particular IP address is discarded. Namely, click information from that particular IP address is suspect. If the query is negatively answered, then method 400 proceeds to step 460.

In step 460, method 400 queries whether the rate of click and page views is significantly greater than the average rate. If the query is positively answered, then method 400 proceeds to step 470 where the click information is discarded. Namely, if the rate or frequency of click and page views is very high, i.e., a user who clicks on a document and then immediately clicks to a different document while spending very little time in viewing the original clicked page, then the click information is suspect. If the query is negatively answered, then method 400 proceeds to step 480.

In step 480, method 400 queries whether the number of clicks on a document within a search result set is significantly greater than the number of clicks on other documents in the same search result set on the same search term. For example, if one particular document is repeatedly accessed within a search result set that is significantly greater than other documents in the same search result set, then the click information is suspect. The premise is that it would be abnormal for a user to repeatedly click on a document in significantly greater frequency than other documents in the same search result. If the query is negatively answered, then method 400 proceeds to step 492 where the original click information is used.

If the query is positively answered, then method 400 proceeds to step 490 where an average of the click information is used. Method 400 ends in step 495.

Figure 5:
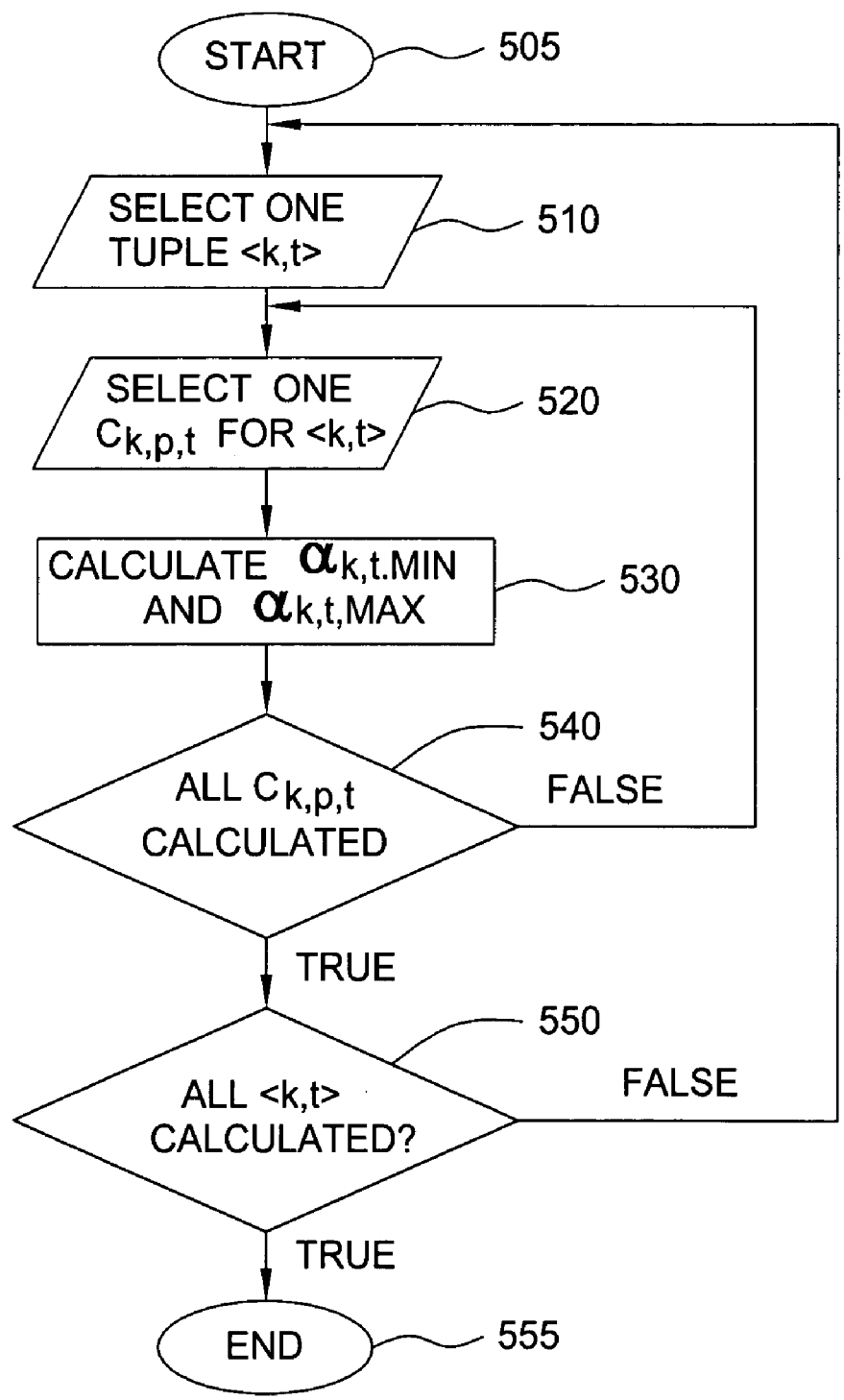
FIG. 5 illustrates a flowchart of a method for calculating a configuration parameter $\alpha$.

FIG. 5 illustrates a flowchart of a method 500 for calculating a configuration parameter α for a type. More specifically, method 500 calculates $\alpha_{k,p,MAX}$ and $\alpha_{k,p,MIN}$ for each <k, t> pair. The configuration parameter is used to describe the impact of different types of purchases and/or clicks. Method 500 starts in step 505 and proceeds to step 510.

Method 500 selects a tuple <k,t> in step 510, where k is a search term, and t is a type. Method 500 in step 520 then selects a $C_{k,p,t}$ for <k,t>, where k is a search term, p is a product, and t is a type. Namely, $C_{k,p,t}$ is a count or a number of the type t events that have occurred over a time period for the search term k on product p.

In step 530, method 500 calculates the configuration parameter α. More specifically, α can be expressed as:

$$\alpha_{k,t,MIN} = m_t \quad \text{(Equ. 1)}$$

$$\alpha_{k,t,MAX} = m_t / \text{MAX}(C_{k,1,t}, C_{k,2,t}, \ldots, C_{k,n,t}) \quad \text{(Equ. 2)}$$

where $m_t$ is a basic score of type t event as shown in Tables 1 and 2 below, which are defined based on two different business requirements. It should be noted that for each type t event, either the "min" or the "max" function in Equ. 1 and 2 can be employed as shown below.

TABLE 1

| Type | $m_t$ |
|---|---|
| min preferred merchant sales: | 150 |
| min related search preferred merchant sales: | 120 |
| max preferred merchant clicks: | 100 |
| max non-preferred (store) sales: | 80 |

TABLE 1-continued

| Type | $m_t$ |
|---|---|
| min catalog sales: | 600 |
| min related search catalog sales: | 500 |
| min mapped catalog sales: | 550 |
| min related search mapped catalog sales: | 450 |
| max mapped catalog click: | 160 |
| min knowledge-based sales: | 580 |

TABLE 2

| Type | $m_t$ |
|---|---|
| min preferred merchant sales: | 110 |
| min related search preferred merchant sales: | 105 |
| max preferred merchant clicks: | 100 |
| min non-preferred (store) sales: | 105 |
| min catalog sales: | 600 |
| min related search catalog sales: | 500 |
| min mapped catalog sales: | 550 |
| min related search mapped catalog sales: | 450 |
| max mapped catalog click: | 160 |
| min knowledge-based sales: | 550 |

It should be noted that the values $m_t$ assigned to the various types of sales and clicks can be adjusted to address a particular implementation. The following types are defined as follows:

Preferred merchant sales are defined to be sales made with a preferred merchant. The criteria that define a merchant as a preferred merchant are application specific, e.g., a merchant that provides a fee to a searching entity may be considered a preferred merchant.

Related search preferred merchant sales are defined to be sales made with a search term that is related to the search term but included the name of a preferred merchant. To illustrate, assume that there are two search terms: "digital camera" and "Sony digital camera". A purchase of a product "A" from a search result generated from the search term "Sony digital camera" will cause the $m_t$ of 120 as shown in Table 1 to be added to the score of product "A", whereas a purchase of product "A" from a search result generated from the search term "digital camera" will cause the $m_t$ of 150 as shown in Table 1 to be added to the score of product "A". This approach relates the narrower search "Sony digital camera" to the broader and more generic search term "digital camera".

Preferred merchant clicks are defined to be clicks on a document within a search result set that is associated with a preferred merchant.

Non-preferred sales are defined to be sales made with a non-preferred merchant, e.g., a small merchant. The criteria that define a merchant as a non-preferred merchant are application specific, e.g., a small merchant that provides a small fee or no fee to a searching entity may be considered a non-preferred merchant.

Catalog sales are defined to be sales made with a catalog page or product guide page. A catalog page is defined to be a display page for a particular product that displays one or more of the following information: a list of merchants, a list of merchant-price pairs (e.g., a merchant who is offering the product at a particular price), a list of reviews of the product, a product description and the like. A purchase made from this catalog page is presumed to be highly relevant to the search term.

Related catalog sales are defined to be sales made with a related catalog page or product guide page. To illustrate, assume that there are two search terms: "digital camera" and "Sony digital camera". A purchase of a product "A" from a catalog page generated from the search term "Sony digital camera" will cause the $m_t$ of 500 as shown in Table 1 to be added to the score of product "A" for search term "digital camera", whereas a purchase of product "A" from a catalog page generated from the search term "digital camera" will cause the $m_t$ of 600 as shown in Table 1 to be added to the score of product "A".

Mapped catalog sales are defined to be sales associated with a mapped catalog page or product guide page. Namely, the purchase is not made from a catalog page, but instead, the purchase is made directly through a merchant's page. For example, the search result for a particular search term contains a plurality of catalog pages and a plurality of merchant pages. The user then elects to access a particular merchant page and the purchase of the product is then made directly with the merchant. Thus, the purchase of the product was detected to have been purchased directly from a particular merchant, and if the system also detects that the purchased product was "mapped" to a particular catalog page or product guide page, then the purchase information will cause the $m_t$ of 550 as shown in Table 1 to be added to the score of the catalog page. It should be noted that hotscores are broadly generated for documents, where documents may include a product, a merchant-product pair or a catalog page. Assigning a high score to a relevant catalog page is desirable because the user is presented with a comparison of merchants who are offering the same product. In other words, purchasing a product in a catalog page is an ideal shopping environment, where the assignment of a high hotscore will cause the catalog page to be presented frequently to the user.

Related search mapped catalog sales are defined to be sales associated with a related mapped catalog page or related mapped product guide page.

Mapped catalog clicks are defined to be clicks on a merchant page that can be mapped to a catalog page or product guide page. Namely, the click is not made to a catalog page, but instead, the click is made directly to a merchant's page. For example, the search result for a particular search term contains a plurality of catalog pages and a plurality of merchant pages. The user then elected to click a particular merchant page for a product. If the system also detects that the clicked product was "mapped" to a particular catalog page or product guide page, then the click information will cause the $m_t$ of 160 as shown in Table 1 to be added to the score of the catalog page.

Knowledge-based sales are defined to be sales made with results that were adjusted based upon some knowledge of the search term. For example, if the search term was "sony", then the search term is adjusted to be "brand=Sony". Sales of product from such search results will cause a purchased product to receive the $m_t$ of 580 as shown in Table 1.

Returning to FIG. 5, in step 540, method 500 queries whether all $C_{k,p,t}$ have been calculated, e.g., in accordance with Equ. 2 as shown above. If the query is negatively answered, then method 500 returns to step 520. If the query is positively answered, then method 500 proceeds to step 550.

In step 550, method 500 queries whether all tuples of <k,t> have been summarized. If the query is negatively answered, then method 500 returns to step 510. If the query is positively answered, then method 500 ends in step 555.

Figure 6:
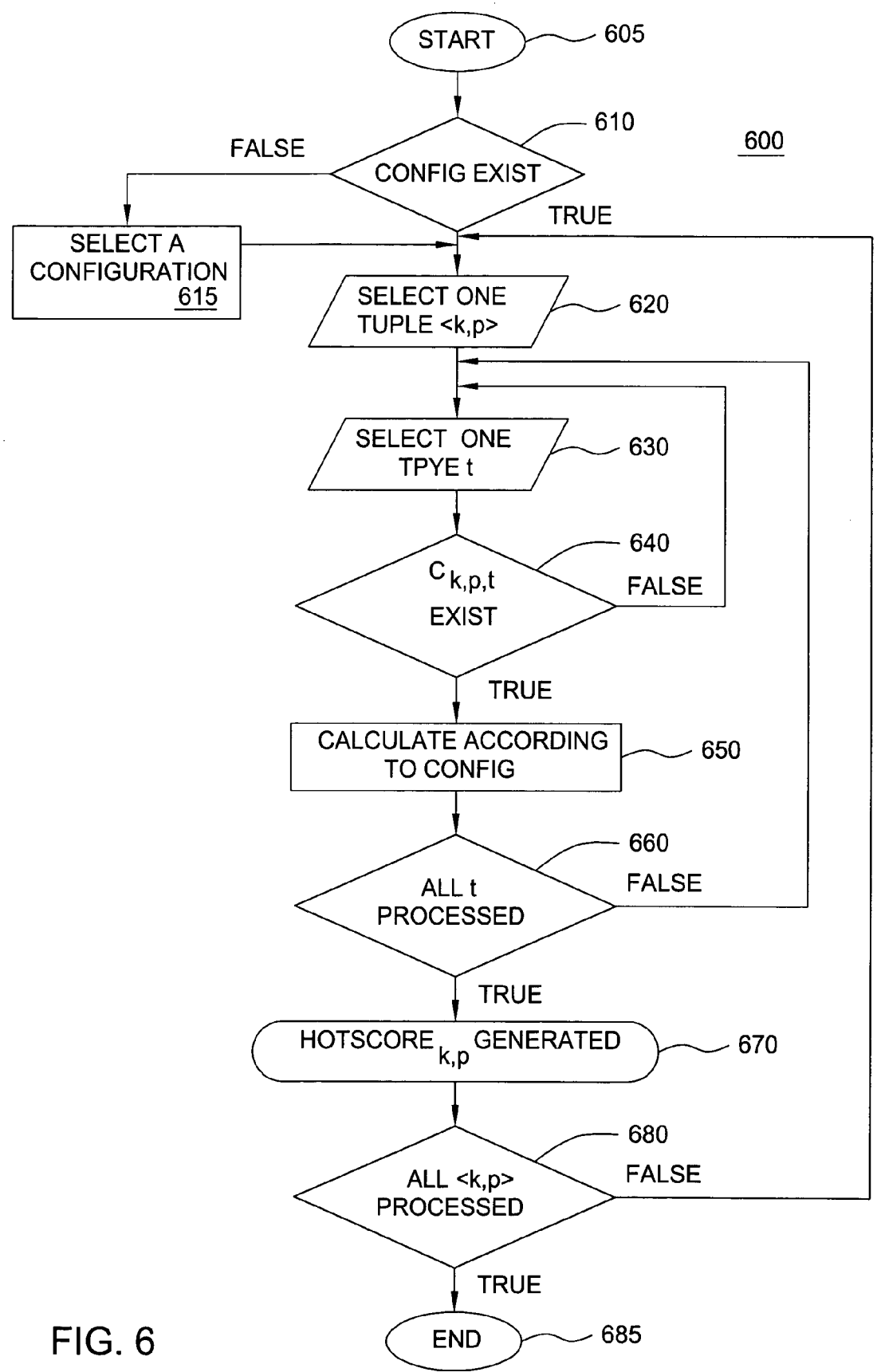
FIG. 6 illustrates a flowchart of a method for generating the hotscores of the present invention.

FIG. 6 illustrates a flowchart of a method 600 for generating the hotscores of the present invention. Method 600 starts in step 605 and proceeds to step 610.

In step 610, method 600 optionally queries whether a particular configuration has been selected for generating the hotscores. Namely, in one embodiment, a plurality of configurations or formulas can be deployed to address different system requirements. For example, some systems may favor the use of hotscores, thereby causing a MAX configuration to be selected, where the hotscores will have a significant impact on the documents listed in a search result set. Alternatively, some systems may want to temper the use of hotscores, thereby causing a MIN configuration to be selected, where the hotscores will have a lesser impact on the documents listed in a search result set.

However, if multiple configurations are not contemplated, step 610 can be omitted and a standard configuration is selected. If the query is negatively answered, then method 600 proceeds to step 615, where a configuration is selected. If the query is positively answered, then method 600 proceeds to step 620.

Method 600 selects a tuple <k,p> in step 620, where k is a search term, and p is a product. Method 600 then selects a type t in step 630.

In step 640, method 600 queries whether $C_{k,p,t}$ for <k,p,t> exists, where k is a search term, p is a product, and t is a type. $C_{k,p,t}$ is a count or a number of the type t events that have occurred over a time period for the search term k on product p. If the query is negatively answered, then method 600 returns to step 630, where another type is selected. If the query is positively answered, then method 600 proceeds to step 650.

In step 650, method 600 calculates a configuration factor, $\alpha$, in accordance with a selected configuration. In one embodiment, for a search term k, a merchant/product pair p's hotscore is defined as:

$$\text{Hotscore}_{k,p} = \Sigma(\alpha_{k,t,T(t)} C_{k,p,t}) \quad \text{(Equ. 3)}$$

where $C_{k,p,t}$ is the number of the occurrences of type t event for search term k on product p. $\alpha_{k,t,T(t)}$ is the configuration factor defined above in Equ. 2 and Equ. 3.

In one embodiment, T(t) functions can be defined, e.g., where T(t) can be either a MAX function or a MIN function. Examples of their values are illustrated in Tables 1 and 2 above. The values for the T(t) functions can be predefined in the scoring system's configuration. Although the present invention discloses two configuration functions, MAX and MIN, the present invention is not so limited. Namely, any number of configurations can be deployed to address the requirements of a particular scoring system.

In step 660, method 600 queries whether all type t have been processed. If the query is negatively answered, then method 600 returns to step 630, where another type is selected. If the query is positively answered, then method 600 proceeds to step 670, where Equ. 3 is used to generate the hotscore for the selected tuple <k,p>.

In step 680, method 600 queries whether all tuples <k,p> have been processed. If the query is negatively answered, then method 600 returns to step 620, where another tuple is selected. If the query is positively answered, then method 600 ends in step 685.

In one embodiment, the present hotscore is employed in an existing search scoring system. To illustrate, for a search term k, a merchant/product pair p gets a $\text{score}_{k,p}$ as follows:

$$\text{Score}_{k,p} = BT_{k,p} + H(\text{hotscore}_{k,p}) + OB_{k,p} \quad \text{(Equ. 4)}$$

where $BT_{k,p}$ is a basic text relevancy score that product p gets for a search term k, where $hotscore_{k,p}$ is p's hotscore for the search term k, H is a usage function, if necessary, to adjust the hotscore for the search scoring scheme, and $OB_{k,p}$ is the sum of other optional boosting scores for search term k. It should be noted that H is a function that describes how hotscore will be used in the overall score as shown below.

Numerous normalization functions can be employed. Various types of functions are presented below.

In one embodiment, the original hotscore is normalized with an "affect factor" expressed as:

$$H(hotscore_{k,p}) = hotscore_{k,p} * af \qquad (\text{Equ. 5})$$

where af is called an affect factor, which can be defined as follows:

$$af = standard\_hotscore/standard\_score\_for\_hotscore\_in\_whole\_score \qquad (\text{Equ. 6})$$

This function selects a score in hotscore as standard, and a score in the whole scores as standard score of hotscore part. Then hotscore is applied into the whole scoring by using affect factor. In this approach, there is no setting of upper or lower ceiling for hotscore's usage. Thus, very high confidence products will be guaranteed to have a high rank.

In a second embodiment, a hotscore can be normalized as follows:

If $hotscore_{k,p} = 0$, then $H(hotscore_{k,p}) = 0$;

Otherwise, $$H(h_{k,p}) = H_L + (H_U - H_L) * (h_{k,p} - \text{MIN}(h_{k,1}, h_{k,2}, \ldots, h_{k,n})) / (\text{MAX}(h_{k,1}, h_{k,2}, \ldots, h_{k,n}) - \text{MIN}(h_{k,1}, h_{k,2}, \ldots, h_{k,n})) \qquad (\text{Equ. 7})$$

where $H_L$ is the lower bound of hotscore in the total score, and $H_U$ is the upper bound of hotscore in the total score. Function H decides how a big role hotscore should play in the search scoring. $H_U$ defines the maximum effects that a hotscore has in the score, and $H_L$ defines the minimum effects that a hotscore has in the score.

One extreme scheme is to assign very large values to $H_U$ and $H_L$, so that the hotscore will dominate the whole score. Alternatively, the other extreme is to assign very small values to $H_U$ and $H_L$, so that the hotscore only affects ranking of products with the same $BT_{k,p}$ and $OB_{k,p}$ of Equ. 4. The former approach is appropriate for a closed system, where all transaction information is available. For an open system where only some of the sales information is available, it may be more appropriate to only assign a high value to $H_U$ to have the high confident hotscore dominate the score, while low confident hotscore only plays a very limited role, and is mixed with other scoring effects.

In a third embodiment, the hotscore can be position normalized. Specifically, let $AC_i$ be all click number at position i, $C_{k,p,i}$ be the click number of product p for search term k at position i, $NC_{k,p,i}$ be the normalized click number of product p for search term k at position i, such that:

$$NC_{k,p,i} = C_{k,p,i} * AC_0 / AC_i \qquad (\text{Equ. 8})$$

where $AC_0/AC_i$ is called the regular boost factor for position i. In order to dampen the impact of clicks on very high position documents within a search result set, the present approach may limit $AC_i$ to some number such as $AC_{30}$ so that one wrong click on a high position will not disproportionately affect the whole scoring system.

Additionally, since click position on an <k, p> pair may be different in different days, i is determined by calculating average click position on <k, p> for a given time period.

This function compares click numbers on one position for one <k, p> pair with average click numbers. Only those better than normal click rates can have a high number after normalized, i.e., it actually compares $C_{k,p,0}/C_{k,p,i}$ to $AC_0/AC_i$. Thus, this approach will minimize the probability of self-boosting. It should be noted that the same function can be applied to sales position normalization.

In a fourth embodiment, the hotscore can be time normalized. Specifically, let E be the number that an event occurs, NE be the normalized number for the event, age be the number of days from the current time that the event occurred, ff be a "forget factor", i.e., the ratio that the system tends to forget an event. Forget factor is defined in a configuration file so that the present system can tune it accordingly. E is normalized as follows:

$$NE = E * (1 - ff)^{age}, (0 <= age <= n) \qquad (\text{Equ. 9})$$

The upper range (n) for "age" in Equ. 9 can be adjusted to meet the requirement of a particular application or for different products.

Figure 7:
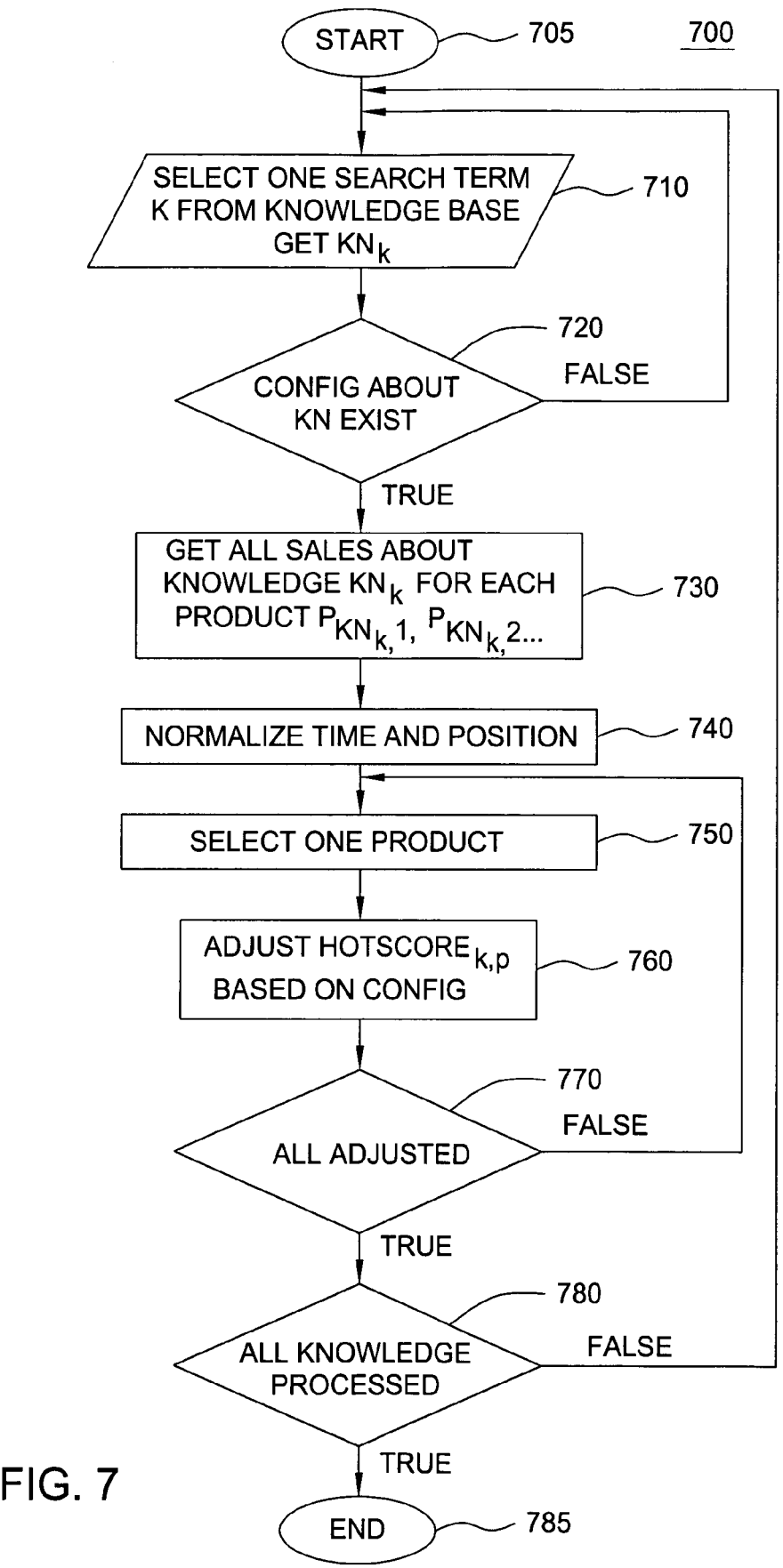
FIG. 7 illustrates a flowchart of a method for adjusting the hotscore of the present invention.

FIG. 7 illustrates a flowchart of a method 700 for adjusting the hotscore of the present invention based on a knowledge parameter. Method 700 starts in step 705 and proceeds to step 710.

In step 710, method 700 selects a search term k from a knowledge base. Namely, a knowledge $KN_k$ is retrieved. For example, if the search term is "dell", then the knowledge $KN_k$ can be expressed as "Manufacturer=Dell".

In step 720, method 700 queries whether a configuration factor or a formula exists for the application of the knowledge $KN_k$. For example, the configuration factor may dictate that all Dell products have their hotscores adjusted to account for sales of all Dell products. Alternatively, the configuration factor may dictate that all Dell computer products have their hotscores adjusted to account for sales of all Dell computer products, and so on. If the query is negatively answered, then method 700 returns to step 710 and another search term is selected. If the query is positively answered, then method 700 proceeds to step 730.

In step 730, method 700 retrieves all sales information pertaining to knowledge $KN_k$ for each product ($P_{KNk}1$), ... ($P_{KNk}n$). For example, sales information for desktop computers, laptops, PDAs, printers, monitors, speakers and so on are collected. This information can be applied below.

In step 740, method 700 may optionally apply time and position normalization as described above.

In step 750, method 700 selects a product p from among the products noted in step 730. For example, a Dell desktop computer is selected.

In step 760, method 700 adjusts the $hotscore_{k,p}$ based upon the configuration factor or formula noted in step 720. For example, the hotscore for a Dell desktop computer is adjusted such that sales information for Dell laptops is used to boost the hotscore for a Dell desktop computer. The rationale for this adjustment may be that Dell is a preferred merchant or that there is a knowledge that purchasers who prefer Dell laptop would prefer Dell desktop as well. In this manner, specific knowledge can be exploited to further refine the hotscore.

In step 770, method 700 queries whether all pertinent products have been adjusted. If the query is negatively answered, then method 700 returns to step 750 and another product is selected. If the query is positively answered, then method 700 proceeds to step 780.

In step 780, method 700 queries whether all pertinent knowledge has been processed. If the query is negatively answered, then method 700 returns to step 710 and another search term is selected. If the query is positively answered, then method 700 ends in step 785.

Figure 8:
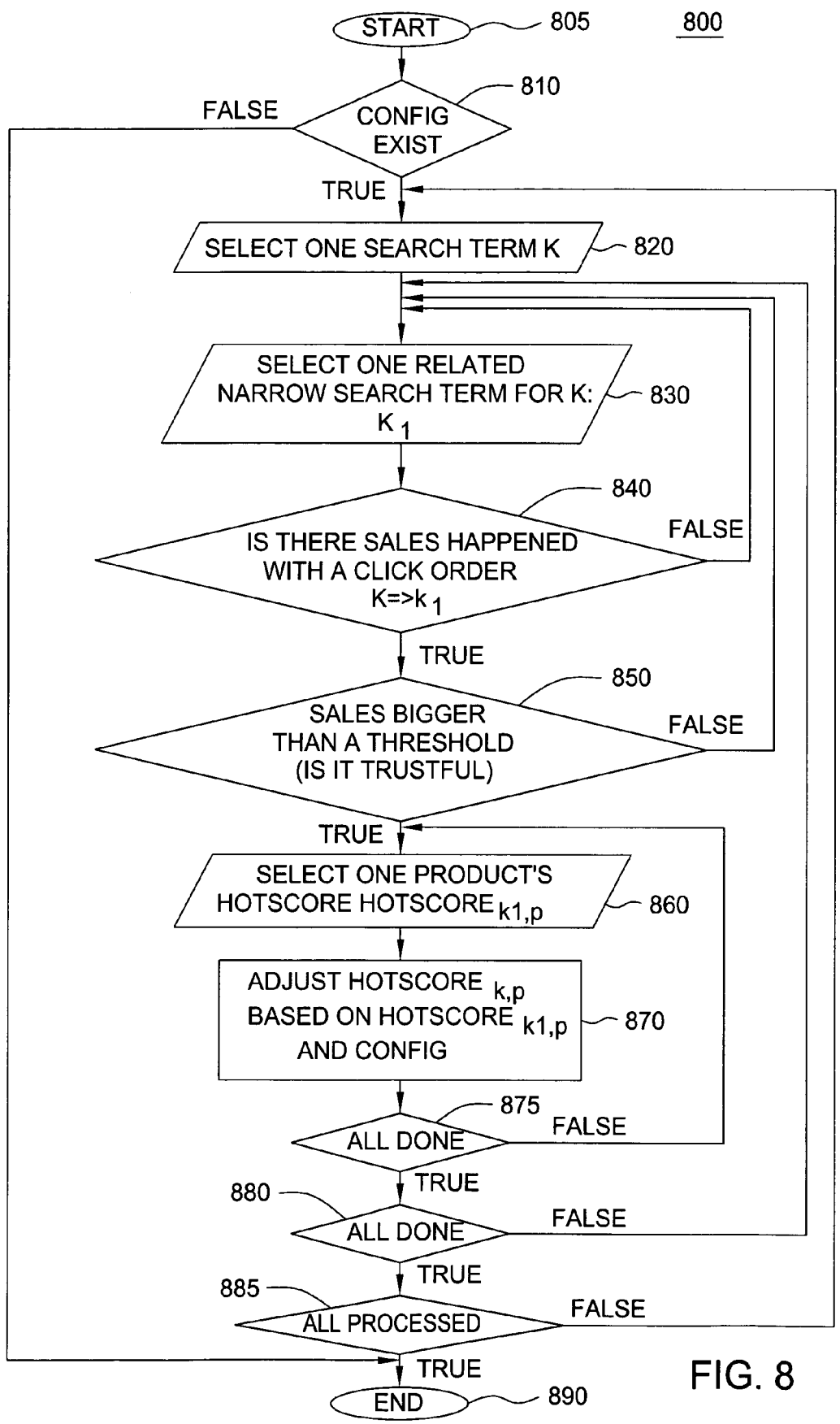
FIG. 8 illustrates a flowchart of a second method for adjusting the hotscore of the present invention.

FIG. 8 illustrates a flowchart of a method 800 for adjusting the hotscore of the present invention based on a related narrower search. Method 800 starts in step 805 and proceeds to step 810.

In step 810, method 800 queries whether a configuration factor or a formula exists for the application of related narrower searches. For example, a search term "computer with SDRAM" will be considered a narrower search term for "computer". If the query is negatively answered, then method 800 ends in step 890. If the query is positively answered, then method 800 proceeds to step 820.

In step 820, method 800 selects a search term k. In turn, method 800 selects a related narrower search term $k_1$ in step 830.

In step 840, method 800 queries whether there is sales and/or click information associated with the related narrower search term $k_1$. For example, method 800 may determine if there is any sales information associated with the search term "computer with SDRAM". If the query is negatively answered, then method 800 returns to step 830 and another related search term $k_n$ is selected. If the query is positively answered, then method 800 proceeds to step 850.

In step 850, method 800 queries whether the sales information for a related search term is greater than a threshold. In other words, method 800 is determining whether the sales information is trustworthy for use in adjusting the hotscore for the search term k. In one embodiment, it may be prudent to verify that there is significant sales for a related narrower search term before the sales information is actually applied to affect a broader and more generic search term. Thus, if the query is negatively answered, then method 800 returns to step 830 and another related search term $k_n$ is selected. If the query is positively answered, then method 800 proceeds to step 860.

In step 860, method 800 selects a hotscore from a product listed in a search result set derived from the search term k. Next, the hotscore$_{k,p}$ is adjusted in accordance with the sales and/or click information associated with the search term $k_i$. In fact, the hotscore$_{k,p}$ can be adjusted directly in accordance with the hotscore$_{ki,p}$.

In step 870, method 800 queries whether all the hotscores of products from the search result set derived from the search term k have been adjusted. If the query is negatively answered, then method 800 returns to step 860 and another product is selected. If the query is positively answered, then method 800 proceeds to step 880.

In step 880, method 800 queries whether all related narrower search terms have been processed. If the query is negatively answered, then method 800 returns to step 830 and another search term is selected. If the query is positively answered, then method 800 proceeds to step 885.

In step 885, method 800 queries whether all generic search terms have been processed. If the query is negatively answered, then method 800 returns to step 820 and another generic search term is selected. If the query is positively answered, then method 800 ends in step 890.

It should be noted that the above disclosure describes the present invention within the context of shopping. However, those skilled in the art will realize that the present invention is not so limited. Namely, in one embodiment, the present invention can be implemented for searching in general, e.g., generating the scores in accordance with the click information.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for arranging search results comprising:
    capturing sales information associated with a document, wherein the document was returned in a search result set formed in response to a search term;
    determining relative responsiveness, compared with other members of the search result set, of the document to the search term based on the sales information and on a position of the document in an ordering of the search result set;
    generating a score for association with the document reflecting the relative responsiveness of the document to the search term; and
    using the score to affect a response to a subsequent search.

2. The method of claim 1, wherein the subsequent search uses the search term, and the response includes a search result set, the ordering thereof affected by use of the score.

3. The method claim 1, further comprising adjusting the score to account for a specific knowledge of the document.

4. The method claim 1, further comprising adjusting the score to account for a specific knowledge of the search term.

5. The method of claim 1, further comprising applying the score in conjunction with a text relevancy score, a paid inclusion score, or a paid sponsorship score.

6. The method of claim 5, further comprising applying a usage function to said score.

7. The method of claim 1, wherein said document includes a product page.

8. The method of claim 1, wherein said document is a catalog page.

9. The method of claim 8, wherein said catalog page represents a display page for a product that displays a plurality of merchants who are offering said product.

10. The method of claim 9, wherein said catalog page also displays pricing information for said product by said plurality of merchants.

11. The method of claim 1, wherein the relative responsiveness of the document to the search term accounts for at least one sales type.

12. The method of claim 11, wherein said at least one sales type comprises a preferred merchant sales type that represents sales made with a preferred merchant.

13. The method of claim 11, wherein said at least one sales type comprises a non-preferred merchant sales type that represents sales made with a non-preferred merchant.

14. The method of claim 11, wherein said at least one sales type comprises a related search preferred merchant sales type that represents sales made with a preferred merchant from a related search.

15. The method of claim 11, wherein said at least one sales type comprises a catalog sales type that represents sales made with a catalog page.

16. The method of claim 15, wherein said catalog page represents a display page for a product that displays a plurality of merchants who are offering said product.

17. The method of claim 11, wherein said at least one sales type comprises a related search catalog sales type that represents sales made with a catalog page from a related search.

18. The method of claim 11, wherein said at least one sales type comprises a mapped catalog sales type that represents sales of a product that is associated with a catalog page.

19. The method of claim 11, wherein said at least one sales type comprises a related search mapped catalog sales type that represents sales of a product that is associated with a catalog page from a related search.

20. The method of claim 11, further comprising computing a configuration parameter for each of said at least one sales type, wherein said score is generated in accordance with said configuration parameter and said at least one sales type.

21. The method of claim 20, wherein said score is generated in accordance with:

$$\text{Hotscore}_{k,p} = \Sigma(\alpha_{k,t,T(t)} C_{k,p,t})$$

where $C_{k,p,t}$ is a number of said at least one sales type t's occurrence for said search term k on said document p, and $\alpha_{k,t,T(t)}$ is said configuration parameter.

22. The method of claim 1, wherein generating includes selecting a configuration for generating the score.

23. The method of claim 1, wherein the sales information comprises at least one merchant/product identification pair associated with the search term, each of the at least one merchant/product identification pertaining to a product purchased subsequent to return of the search result set.

24. The method of claim 23, further comprising categorizing the at least one merchant/product identification pair into at least one type; and eliminating at least one merchant/product identification pair deemed to below confidence.

25. The method of claim 1, wherein generating a score comprises selecting a formula emphasizing a scoring strategy from a plurality of formulas, each of the plurality emphasizing a different scoring strategy.

26. A computer readable medium encoded with computer readable program code, the program code comprising:

instructions operable to obtain sales information associated with a document, wherein the document was returned in a search result set formed in response to a search term;

instructions operable to determine relative responsiveness, compared with other members of the search result set, of the document to the search term based on the sales information and on a position of the document in an ordering of the search result set; and instructions operable to generate a score for association with the document reflecting the relative responsiveness of the document to the search term.

27. The computer readable medium of claim 26 wherein said score is applied to affect an ordering of the search result set in response to at least one subsequent search using the search term.

28. The computer readable medium of claim 26 further comprising: instructions for adjusting said score to account for passage of time.

29. The computer readable medium of claim 26 further comprising: instructions for adjusting said score to account for positioning of said document within a listing order of said search result set.

30. The computer readable medium claim 26 further comprising: instructions for adjusting said score to account for a specific knowledge of said document.

31. The computer readable medium claim 26 further comprising: instructions for adjusting said score to account for a specific knowledge of said search term.

32. The computer readable medium of claim 26 further comprising: instructions for applying said score in conjunction with a text relevancy score, a paid inclusion score, or a paid sponsorship score.

33. The computer readable medium of claim 26 further comprising: instructions for applying a usage function to said score.

* * * * *